United States Patent
Xu et al.

(10) Patent No.: US 10,892,977 B2
(45) Date of Patent: Jan. 12, 2021

(54) ROUTE DETECTION METHOD IN A BGP MONITORING PROTOCOL SESSION

(71) Applicant: Huawei Technologies Co., Ltd., Shenzhen (CN)

(72) Inventors: Haijun Xu, Beijing (CN); Shunwan Zhuang, Beijing (CN); Haibo Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/427,557

(22) Filed: May 31, 2019

(65) Prior Publication Data

US 2019/0297001 A1    Sep. 26, 2019

Related U.S. Application Data

(63) Continuation of application No. PCT/CN2017/112518, filed on Nov. 23, 2017.

(30) Foreign Application Priority Data

Dec. 1, 2016    (CN) .......................... 2016 1 1094351

(51) Int. Cl.
  *H04L 12/28*    (2006.01)
  *H04L 12/715*    (2013.01)
  (Continued)

(52) U.S. Cl.
  CPC .............. *H04L 45/04* (2013.01); *H04L 12/66* (2013.01); *H04L 45/02* (2013.01); *H04L 45/128* (2013.01);
  (Continued)

(58) Field of Classification Search
  CPC ......... H04L 45/04; H04L 12/66; H04L 45/02; H04L 45/18; H04L 45/28
  See application file for complete search history.

(56) References Cited

U.S. PATENT DOCUMENTS

2010/0124170 A1*  5/2010  Xu ..................... H04L 45/28
                                                                    370/242
2012/0254465 A1* 10/2012  Papadimitriou ........ H04L 45/14
                                                                    709/242
(Continued)

FOREIGN PATENT DOCUMENTS

CN    102281199 A    12/2011
CN    106161256 A    11/2016
CN    106169978 A    11/2016

OTHER PUBLICATIONS

Scudder, J. et al., "BGP Monitoring Protocol, draft-ietf-grow-bmp-11," Jul. 20, 2015, 26 pages.
(Continued)

*Primary Examiner* — Abdelnabi O Musa
(74) *Attorney, Agent, or Firm* — Slater Matsil, LLP

(57) ABSTRACT

A method includes: establishing, by a first network device, a first BMP session with a second network device, and establishing a second BMP session with a third network device; receiving a first BGP route set sent by the second network device, where the first BGP route set includes a BGP route sent by the second network device to the third network device; receiving a second BGP route set sent by the third network device, where the second BGP route set includes the BGP route received by the third network device from the second network device; and when detecting that the second BGP route set includes a first BGP route but the first BGP route set does not include the first BGP route, determining the first BGP route as an unavailable route.

23 Claims, 7 Drawing Sheets

(51) Int. Cl.

| | | |
|---|---|---|
| *H04L 12/66* | (2006.01) | |
| *H04L 12/705* | (2013.01) | |
| *H04L 29/06* | (2006.01) | |
| *H04L 12/703* | (2013.01) | |
| *H04L 12/735* | (2013.01) | |
| *H04L 12/751* | (2013.01) | |

(52) U.S. Cl.
CPC ............. *H04L 45/18* (2013.01); *H04L 45/28* (2013.01); *H04L 65/1003* (2013.01); *H04L 65/1069* (2013.01)

(56) References Cited

U.S. PATENT DOCUMENTS

| | | | | |
|---|---|---|---|---|
| 2013/0121340 | A1* | 5/2013 | Papadimitriou | H04L 45/02 370/410 |
| 2016/0241457 | A1* | 8/2016 | Semwal | H04L 65/1069 |
| 2017/0346787 | A1* | 11/2017 | Menon | H04L 67/142 |

OTHER PUBLICATIONS

Rosen, E.C., "Exterior Gateway Protocol (EGP)," RFC 827, Oct. 1982, 42 pages.

McGloghrie, K. et al., "Management Information Base for Network Management of TCP/IP-based internets: MIB-II," RFC1213, Mar. 1991, 70 pages.

Haskin, D., "Default Route Advertisement in BGP2 and BGP3 Versions of The Border Gateway Protocol," RFC1397, Jan. 1993, 2 pages.

Varadhan, K, "BGP OSPF Interaction," RFC1403, Jan. 1993, 17 pages.

Fuller, V. et al., "Classless Inter-Domain Routing (CIDR): an Address Assignment and Aggregation Strategy," RFC1519, Sep. 1993, 24 pages.

Rekhter, Y. et al., "A Border Gateway Protocol 4 (BGP-4)," RFC1654, Jul. 1994, 56 pages.

Rekhter, Y. et al., "Application of the Border Gateway Protocol in the Internet," RFC1655, Jul. 1994, 19 pages.

Traina, P., "BGP-4 Protocol Document Roadmap and Implementation Experience," RFC1656, Jul. 1994, 4 pages.

Willis, S. et al., "Definitions of Managed Objects for the Fourth Version of the Border Gateway Protocol (BGP-4) using SMIv2," RFC1657, Jul. 1994, 21 pages.

Rekhter, Y. et al., "A Border Gateway Protocol 4 (BGP-4)," RFC1771, Mar. 1995, 57 pages.

Scudder, J., et al., "BGP Monitoring Protocol (BMP)", Internet Engineering Task Force (IETF), ISSN: 2070-1721, RFC7854, Jun. 2016, 27 pages.

Shakir, R., "Operational Requirements for Enhanced Error Handling Behaviour in BGP-4," draft-ietf-grow-ops-reqs-for-bgperror-handling-06, Dec. 27, 2012 pp. 1-19.

* cited by examiner

ROUTE DETECTION METHOD IN A BGP MONITORING PROTOCOL SESSION

CROSS-REFERENCE TO RELATED APPLICATIONS

This application is a continuation of International Application No. PCT/CN2017/112518, filed on Nov. 23, 2017, which claims priority to Chinese Patent Application No. 201611094351.9, filed on Dec. 1, 2016. The disclosures of the aforementioned applications are hereby incorporated by reference in their entireties.

TECHNICAL FIELD

Embodiments of this application relate to the field of communications technologies, and especially, to a route detection method and a network device.

BACKGROUND

The Border Gateway Protocol (BGP) Monitoring Protocol (BMP) can be used to monitor a BGP running status of a device in a network in real time. The BGP running status includes establishment, breakdown, and the like that are of a peer relationship. However, when the BGP running status is normal, validity of a BGP route cannot be detected.

SUMMARY

Embodiments of this application provide a route detection method, to resolve a technical problem that validity of a BGP route cannot be detected.

According to a first aspect, an embodiment of this application provides a route detection method. The method includes establishing, by a first network device, a first BMP session with a second network device, and establishing, by the first network device, a second BMP session with a third network device. The method also includes receiving, by the first network device by using the first BMP session, a first BGP route set sent by the second network device, where the first BGP route set includes one or more BGP routes sent by the second network device to the third network device, and a BGP peer has been established between the third network device and the second network device. The method also includes receiving, by the first network device by using the second BMP session, a second BGP route set sent by the third network device, where the second BGP route set includes one or more BGP routes received by the third network device from the second network device. The method also includes, when the first network device detects that the second BGP route set includes a first BGP route but the first BGP route set does not include the first BGP route, determining, by the first network device, the first BGP route as an unavailable route.

In the foregoing solution, the first network device receives, by using the first BMP session, the first BGP route set sent by the second network device, and receives, by using the second BMP session, the second BGP route set sent by the third network device. The first network device determines, through comparison, whether BGP routes in the two BGP route sets are the same, so that the first network device can determine whether an exception occurs in a process in which the second network device advertises a BGP route to the third network device, and can detect validity of a BGP route.

In a possible implementation, after the determining, by the first network device, the first BGP route as an unavailable route, the method further includes: identifying, by the first network device, the first BGP route as an unavailable route, and sending the first BGP route identified as an unavailable route to the third network device. When determining that the first BGP route is unavailable, the first network device sends the first BGP route to the third network device, and the third network device may stop using the first BGP route to forward a packet, to improve reliability of packet forwarding in a network.

In a possible implementation, the method further includes: planning, by the first network device, a forwarding path by using an available route in the second BGP route set, where the available route in the second BGP route set does not include the first BGP route. When the first network device determines that the first BGP route is unavailable, the first network device no longer uses the first BGP route to plan the forwarding path, to improve reliability of packet forwarding in the network.

In a possible implementation, a second BGP route in the second BGP route set includes attribute information, the second BGP route is any BGP route in the second BGP route set, and the attribute information includes one or more of the following information: priority information used to indicate a priority of the second BGP route; status information used to indicate a status of the second BGP route in a routing information base (RIB) of the first network device; indication information used to indicate whether the second BGP route is delivered to a forwarding information base (FIB); or information used to indicate a status of the second BGP route information delivered to the FIB.

According to a second aspect, an embodiment of this application provides a route detection method. The method includes: establishing, by a second network device, a BMP session with a first network device. The method also includes generating, by the second network device, a BMP message, where the BMP message includes a BGP route set, the BGP route set includes a first BGP route sent by the second network device to a third network device, and a BGP peer has been established between the third network device and the second network device. The method also includes sending, by the second network device, the BMP message to the first network device by using the BMP session, to trigger the first network device to detect a BGP route in the BGP route set in the BMP message.

In a possible implementation, the BGP route set further includes a second BGP route received by the second network device, the second BGP route includes attribute information, and the attribute information includes one or more of the following information: priority information used to indicate a priority of the second BGP route; status information used to indicate a status of the second BGP route in a routing information base RIB; advertisement information used to indicate whether the second BGP route is advertised to the third network device; indication information used to indicate whether the second BGP route is delivered to a forwarding information base FIB; or information used to indicate a status of the second BGP route delivered to the FIB.

In a possible implementation, the BMP message further includes specification information of the second network device, and the specification information includes one or more of the following information: a quantity of BGP routes that can be accommodated by the second network device; a default configuration parameter of the second network device; standard information supported by the second network device; or feature information supported by the second network device.

In a possible implementation, the BMP message further includes a BGP routing rule of the second network device, and the BGP routing rule includes one or more of the following: a preferred BGP route rule indicating a short autonomous system (AS) path (Path) length; or a preferred BGP route rule indicating a long route survival period.

According to a third aspect, an embodiment of this application provides a first network device. The first network device includes an establishment unit, configured to: establish a first BMP session with a second network device, and establish a second BMP session with a third network device. The first network device also includes a receiving unit, configured to receive, by using the first BMP session established by the establishment unit, a first BGP route set sent by the second network device, where the first BGP route set includes one or more BGP routes sent by the second network device to the third network device, and a BGP peer has been established between the third network device and the second network device. The receiving unit is further configured to receive, by using the second BMP session established by the establishment unit, a second BGP route set sent by the third network device, where the second BGP route set includes one or more BGP routes received by the third network device from the second network device. The first network device also includes a detection unit, configured to detect that the second BGP route set includes a first BGP route but the first BGP route set does not include the first BGP route. The first network device also includes a determining unit, configured to: when the detection unit detects that the second BGP route set includes the first BGP rout but the first BGP route set does not include the first BGP route, determine the first BGP route as an unavailable route.

In a possible implementation, the first network device further includes: a processing unit, configured to: after the determining unit determines the first BGP route as an unavailable route, identify the first BGP route as an unavailable route; and a sending unit, configured to send the first BGP route identified by the processing unit as an unavailable route to the third network device.

In a possible implementation, the processing unit is further configured to plan a forwarding path by using an available route in the second BGP route set, where the available route in the second BGP route set does not include the first BGP route.

According to a fourth aspect, an embodiment of this application provides a second network device. The second network device includes an establishment unit, configured to establish a BMP session with a first network device. The second network device also includes a generation unit, configured to generate a BMP message, where the BMP message includes a BGP route set, the BGP route set includes a first BGP route sent by the second network device to a third network device, and a BGP peer has been established between the third network device and the second network device. The second network device also includes a sending unit, configured to send the BMP message to the first network device by using the BMP session, to trigger the first network device to detect a BGP route in the BGP route set in the BMP message.

According to a fifth aspect, an embodiment of this application provides a route detection method. The method includes establishing, by a second network device, a BMP session with a first network device. The method also includes generating, by the second network device, a BMP message, where the BMP message includes a BGP route set, the BGP route set includes a BGP route sent by the second network device to a third network device, and a BGP peer has been established between the third network device and the second network device. The method also includes sending, by the second network device, the BMP message to the first network device by using the BMP session.

In the foregoing solution, the second network device sends the BGP route to the third network device, and then sends the route to the first network device, so that the first network device can detect a path advertised by the second network device.

According to a sixth aspect, an embodiment of this application provides a route detection method. The method includes establishing, by a third network device, a BMP session with a first network device. The method also includes generating, by the third network device, a BMP message, where the BMP message includes a second BGP route set, the second BGP route set includes one or more BGP routes received by the third network device from a second network device, and a BGP peer has been established between the third network device and the second network device. The method also includes sending, by the third network device, the BMP message to the first network device by using the BMP session, where a second BGP route in the second BGP route set includes attribute information, the second BGP route is any BGP route in the second BGP route set, and the attribute information includes one or more of the following information: priority information used to indicate a priority of the second BGP route; status information used to indicate a status of the second BGP route in an RIB of the third network device; indication information used to indicate whether the second BGP route is delivered to a forwarding information base FIB; or information used to indicate a status of the second BGP route information delivered to the FIB.

In the foregoing solution, the third network device receives the BGP routes from the second network device, and then sends the BGP routes to the first network device. The BGP routes include attribute information, so that the first network device can more accurately detect availability of a BGP route based on the attribute information.

According to a seventh aspect, an embodiment of this application provides a third network device. The third network device includes an establishment unit, configured to establish a BMP session with a first network device; a generation unit, configured to generate a BMP message, where the BMP message includes a second BGP route set, the second BGP route set includes one or more BGP routes received by the third network device from a second network device, and a BGP peer has been established between the third network device and the second network device. The third network device also includes a sending unit, configured to send the BMP message to the first network device by using the BMP session, where a second BGP route in the second BGP route set includes attribute information, the second BGP route is any BGP route in the second BGP route set, and the attribute information includes one or more of the following information: priority information used to indicate a priority of the second BGP route; status information used to indicate a status of the second BGP route in an RIB of the third network device; indication information used to indicate whether the second BGP route is delivered to a forwarding information base FIB; or information used to indicate a status of the second BGP route information delivered to the FIB.

According to an eighth aspect, an embodiment of this application provides a route detection system, and the system includes a first network device, a second network device, and a third network device. The second network device is configured to: establish a first BMP session with the first network device, and send a first BGP route set to the first network device, where the first BGP route set includes one or more BGP routes sent by the second network device to the third network device, and a BGP peer has been established between the third network device and the second network device. The third network device is configured to: establish a second BMP session with the first network device, and send a second BGP route set to the first network device, where the second BGP route set includes one or more BGP routes received by the third network device from the second network device. The first network device is configured to: receive, by using the first BMP session, the first BGP route set sent by the second network device; receive, by using the second BGP session, the second BGP route set sent by the third network device; and when the first network device detects that the second BGP route set includes a first BGP route but the first BGP route set does not include the first BGP route, determine the first BGP route as an unavailable route.

According to a ninth aspect, an embodiment of this application provides a first network device. The first network device includes a processor and a memory, the memory stores a program instruction and data, and the processor is configured to invoke the program instruction in the memory to perform a corresponding function in the method in the first aspect.

According to a tenth aspect, an embodiment of this application provides a second network device. The second network device includes a processor and a memory, the memory stores a program instruction and data, and the processor is configured to invoke the program instruction in the memory to perform a corresponding function in the method in the second aspect.

According to an eleventh aspect, an embodiment of this application provides a third network device. The third network device includes a processor and a memory, the memory stores a program instruction and data, and the processor is configured to invoke the program instruction in the memory to perform a corresponding function in the method in the sixth aspect.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and persons of ordinary skill in the art may derive other drawings from these accompanying drawings without creative efforts.

DETAILED DESCRIPTION OF ILLUSTRATIVE EMBODIMENTS

The following describes the embodiments of the present application with reference to accompanying drawings.

Figure 1:
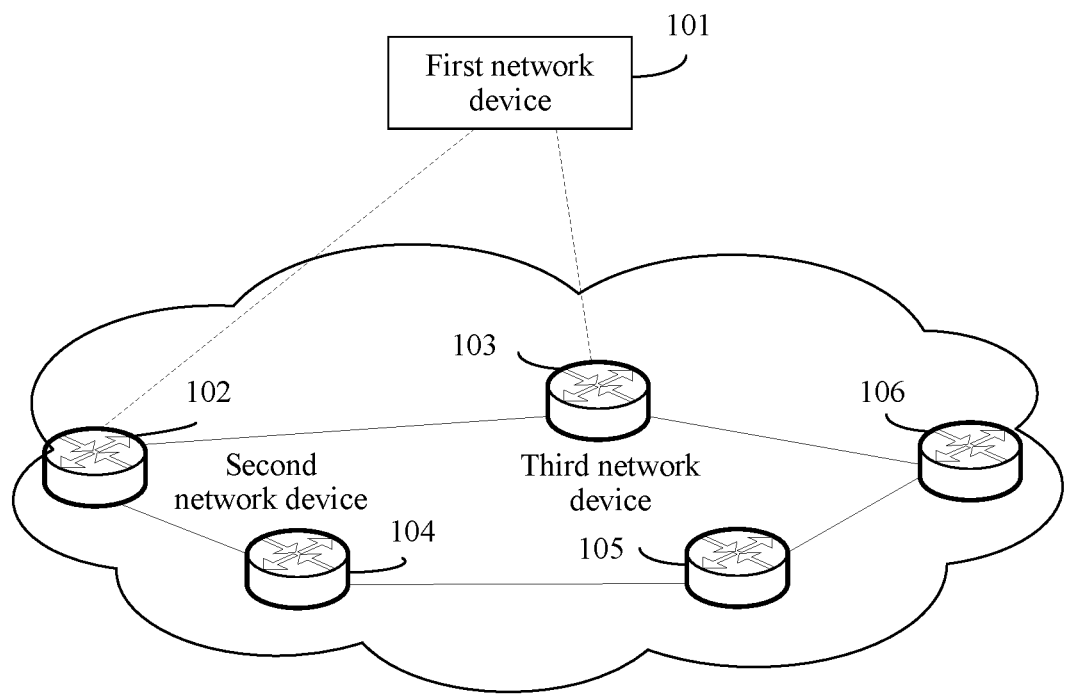
FIG. 1 is a schematic diagram of an application scenario of a route detection method according to an embodiment of this application.

FIG. 1 is a schematic diagram of an application scenario of a route detection method according to an embodiment of this application. The network scenario includes a first network device 101, a second network device 102, a third network device 103, a network device 104, a network device 105, and a network device 106. The foregoing network devices separately support BMP. The first network device 101 and the second network device 102 establish a first BMP session, and the first network device 101 and the third network device 103 establish a second BMP session.

The second network device 102 and the third network device 103 establish a BGP peer. The second network device 102 sends a BGP route to the third network device 103 by using BGP, and stores the sent BGP route in an Adjacency-routing information base-output (Adj-RIB-Out) sent by the second network device 102. The third network device 103 stores, in an RIB Adjacency-routing information base-input (Adj-RIB-In) received by a peer of the third network device 103, the BGP route received from the second network device.

When a network is normal, the BGP route received by the third network device 103 from the second network device 102 is the same as the BGP route sent by the second network device 102 to the third network device 103. However, when the network is abnormal, for example, a link between the second network device 102 and the third network device 103 is unstable, or the network is hacked, the BGP route is rewritten in a process in which the BGP route is sent by the second network device 102 to the third network device 103. In this case, the BGP route received by the third network device 103 cannot be used to normally instruct to forward a packet, and a forwarding path from the network device 106 to the third network device 103 and then to the second network device 102 is unavailable. Under the circumstances, the first network device 101 needs to detect the BGP route, and optimize the forwarding path from the network device 106 to the network device 102.

Optionally, this embodiment of this application can be applied to a control and forwarding separation OpenFlow network architecture. In comparison with a network device in a conventional centralized architecture, control and forwarding separation is to separate a forwarding plane of the network device from a control plane of the network device, and deploy the forwarding plane and the control plane on two different devices. The two devices cooperatively work to forward a data packet in a network. A device corresponding to the control plane is referred to as a control device or a controller, and is deployed on a standalone device independent of the forwarding plane. A device corresponding to the forwarding plane is referred to as a forwarding device or a forwarder. The forwarder can communicate with the controller. The forwarder can communicate with the controller by using a control channel. In FIG. 1, the first network device 101 may be a controller in the control and forwarding separation network architecture, and the second network device 102, the third network device 103, the network device 104, the network device 105, and the network device 106 may be forwarders in the control and forwarding separation network architecture.

Figure 2:
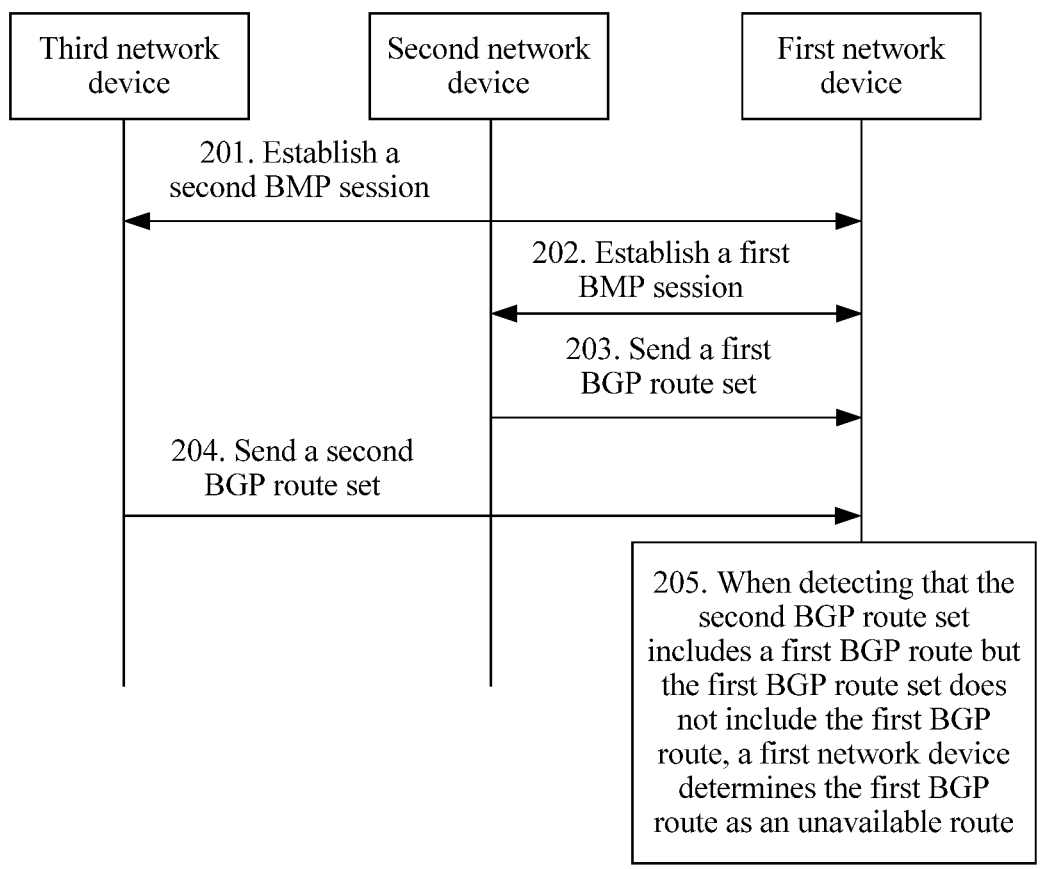
FIG. 2 is a schematic flowchart of a route detection method according to an embodiment of this application.

Referring to FIG. 2, with reference to the application scenario shown in FIG. 1, an embodiment of this application provides a route detection method. The method includes the following steps.

201. A first network device establishes a first BMP session with a second network device.

202. The first network device establishes a second BMP session with a third network device.

203. The first network device receives, by using the first BMP session, a first BGP route set sent by the second network device, where the first BGP route set includes one or more BGP routes sent by the second network device to the third network device, and a BGP peer has been established between the third network device and the second network device.

204. The first network device receives, by using the second BMP session, a second BGP route set sent by the third network device, where the second BGP route set includes one or more BGP routes received by the third network device from the second network device.

205. When the first network device detects that the second BGP route set includes a first BGP route but the first BGP route set does not include the first BGP route, the first network device determines the first BGP route as an unavailable route.

Steps 201 and 202 are not strictly performed in sequence, and steps 203 and 204 are not strictly performed in sequence. After the first network device establishes the first BMP session with the second network device, the second network device may send the first BGP route set to the first network device. After the first network device establishes the second BMP session with the third network device, the third network device may send the second BGP route set to the first network device.

A BGP route in the first BGP route set is sent by the second network device to the third network device by using BGP. After sending the BGP route in the first BGP route set to the third network device, the second network device stores, in an Adj-RIB-Out of the second network device, the BGP route in the first BGP route set, and then sends the BGP route in the Adj-RIB-Out to the first network device. The third network device receives the second BGP route set from the second network device by using BGP, stores, in an Adj-RIB-In of the third network device, the BGP route in the second BGP route set, and then sends the BGP route in the Adj-RIB-In to the first network device.

Optionally, the first network device may be a controller in a control and forwarding separation network architecture. The controller supports BMP, and has a function of a BMP server. The second network device and the third network device also support BMP.

In the foregoing technical solution, the second network device sends, to the first network device, a route that is in the first BGP route set and that is to be advertised to the third network device, and the third network device sends, to the first network device, a route that is in the second BGP route set and that is received from the second network device. The first network device compares the route in the first BGP route set with the route in the second BGP route set. If the first network device determines that the second BGP route set includes the first BGP route but the first BGP route set does not include the first BGP route, the first BGP route is modified in a process in which the first BGP route is sent by the second network device to the third network device, and it is determined that the first BGP route is an unavailable route and cannot be used to instruct to forward packets. The first BGP route may be one or more BGP routes.

Optionally, after the first network device determines, the first BGP route as an unavailable route, the method further includes: identifying, by the first network device, the first BGP route as an unavailable route, and sending the first BGP route identified as an unavailable route to the third network device. In this way, when determining that the first BGP route is unavailable, the first network device sends the first BGP route to the third network device, and the third network device may stop using the first BGP route to forward a packet, to improve reliability of packet forwarding in a network.

Optionally, the method further includes: planning, by the first network device, a forwarding path by using an available route in the second BGP route set, where the available route in the second BGP route set does not include the first BGP route.

As a controller in the network, the first network device may plan the forwarding path in the network. When detecting that the first BGP route is unavailable, the first network device no longer uses the first BGP route to plan the forwarding path. In addition, if only the first BGP route on the third network device arrives at a designated destination, the third network device needs to be avoided in the planned forwarding path. For example, referring to FIG. 1, if the third network device 103 receives, from the second network device 102, a BGP route that arrives at the second network device, but the BGP route is detected as an unavailable route by the first network device 101, and only the BGP route on the third network device 103 can arrive at the second network device 102, when planning a forwarding path from a network device 106 to a network device 102, the first network device 101 needs to avoid the third network device 103, and select another forwarding path, for example, a forwarding path among the network device 106, a network device 105, a network device 104, and the second network device 102.

Optionally, a second BGP route in the second BGP route set includes attribute information, the second BGP route is any BGP route in the second BGP route set, and the attribute information includes one or more of the following information: priority information used to indicate a priority of the second BGP route; status information used to indicate a status of the second BGP route in an RIB of the third network device; indication information used to indicate whether the second BGP route is delivered to an FIB; or information used to indicate a status of the second BGP route delivered to the FIB.

The priority information of the second BGP route may indicate the priority of the second BGP route when the second BGP route is used to select a path or forward a packet, so that the first network device can more efficiently plan the forwarding path based on the priority information.

The status information of the second BGP route in the RIB may indicate the status of the second BGP route in the RIB of the third network device. If the second BGP route in the RIB is in an inactive state, the second BGP route cannot be used to select a route or instruct to forward a packet.

The indication information of the second BGP route may indicate whether the second BGP route is delivered to the FIB of the third network device. If the indication information indicates that the second BGP route is not delivered to the FIB, the second BGP route cannot be used to select a route or instruct to forward a packet.

The information indicating the status of the second BGP route delivered to the FIB may indicate the status of the second BGP route in the FIB. If the second BGP route in the FIB is in an unavailable state, the second BGP route cannot be used to select a route or instruct to forward a packet.

Figure 3:
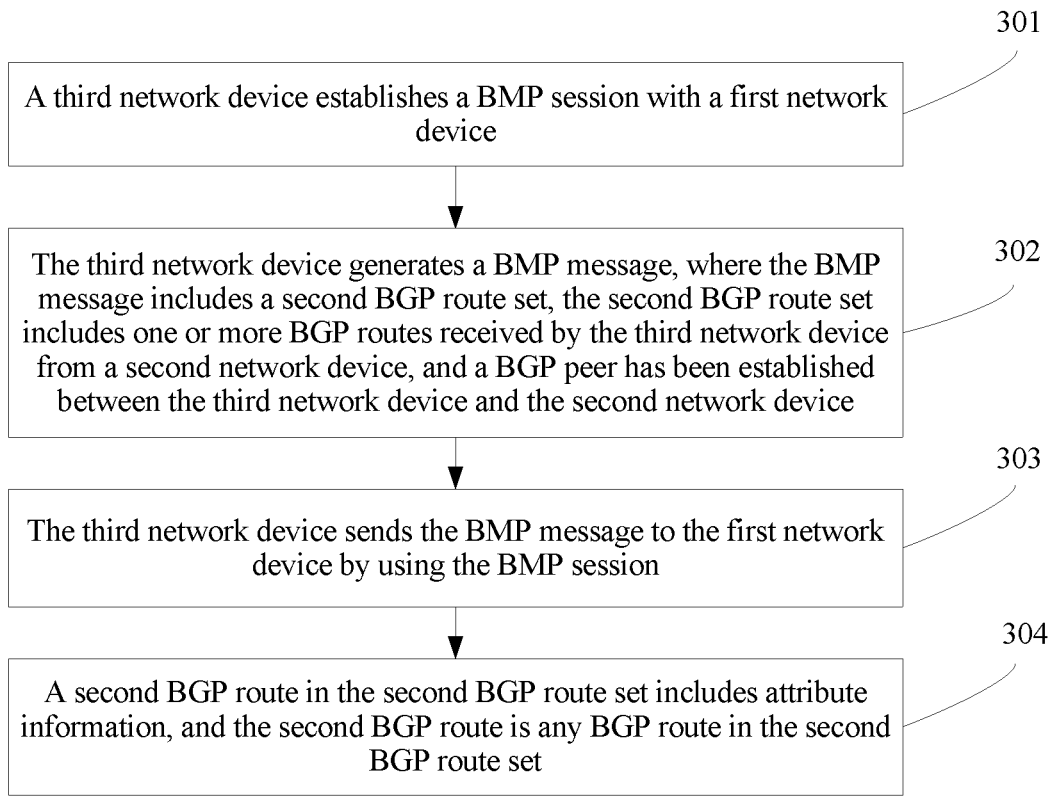
FIG. 3 is a schematic flowchart of another route detection method according to an embodiment of this application.

Referring to FIG. 3, with reference to the application scenario shown in FIG. 1, an embodiment of this application provides a route detection method. The method includes the following steps.

A third network device establishes a BMP session with a first network device.

The third network device generates a BMP message, where the BMP message includes a second BGP route set, the second BGP route set includes one or more BGP routes received by the third network device from a second network device, and a BGP peer has been established between the third network device and the second network device.

The third network device sends the BMP message to the first network device by using the BMP session.

A second BGP route in the second BGP route set includes attribute information, the second BGP route is any BGP route in the second BGP route set, and the attribute information includes one or more of the following information: priority information used to indicate a priority of the second BGP route; status information used to indicate a status of the second BGP route in an RIB of the third network device; indication information used to indicate whether the second BGP route is delivered to an FIB; or information used to indicate a status of the second BGP route delivered to the FIB.

For detailed descriptions of the foregoing attribute information, refer to the embodiment shown in FIG. 2. Details are not described herein again.

Figure 4:
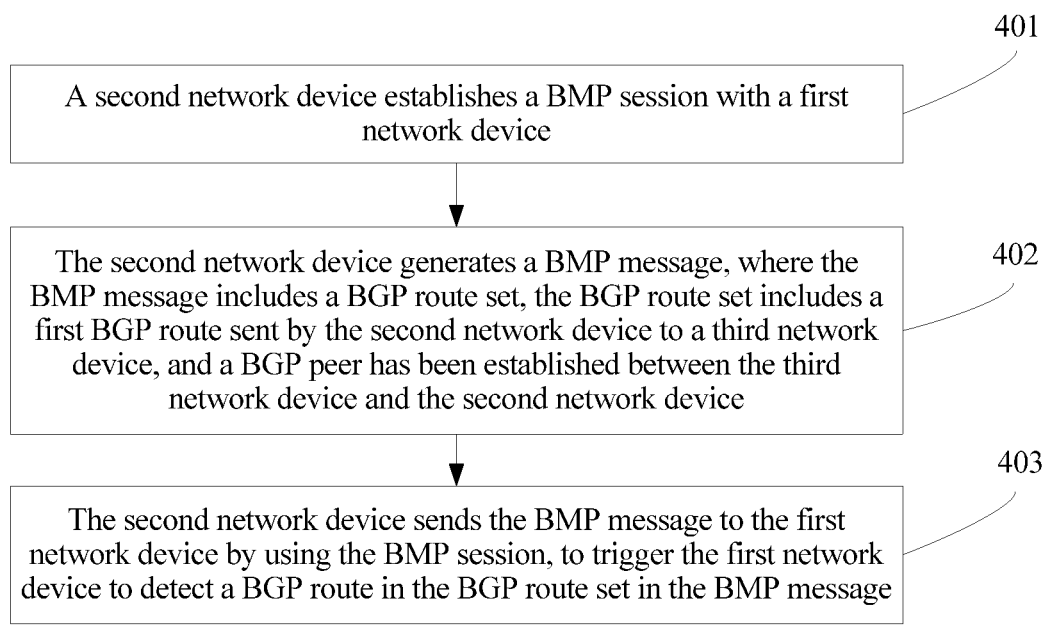
FIG. 4 is a schematic flowchart of another route detection method according to an embodiment of this application.

Referring to FIG. 4, with reference to the application scenario shown in FIG. 1, an embodiment of this application provides a route detection method. The method includes the following steps.

401. A second network device establishes a BMP session with a first network device.

402. The second network device generates a BMP message, where the BMP message includes a BGP route set, the BGP route set includes a first BGP route sent by the second network device to a third network device, and a BGP peer has been established between the third network device and the second network device.

403. The second network device sends the BMP message to the first network device by using the BMP session. After receiving the BMP message, the first network device may detect a BGP route in the BGP route set in the BMP message.

Optionally, for a manner in which the first network device detects the BGP route in the BGP route set, refer to descriptions of the embodiment shown in FIG. 2. Details are not described herein again.

Optionally, the BMP message further includes specification information of the second network device, and the specification information includes one or more of the following information: a quantity of BGP routes that can be accommodated by the second network device; a default configuration parameter of the second network device; standard information supported by the second network device; or feature information supported by the second network device.

The first network device may control, by obtaining the quantity of BGP routes that can be accommodated by the second network device, a quantity of BGP routes to be sent to the second network device, to avoid a problem that when the quantity of BGP routes to be sent to the second network device exceeds the quantity of BGP routes that can be accommodated by the second network device, memory of the second network device is exhausted, or the second network device cannot normally receive the BGP routes sent by the first network device, and consequently cannot normally forward a packet.

The default configuration parameter may be a BGP default configuration parameter or a system default configuration parameter. For example, the BGP default configuration parameter may be a quantity of peers supported by BGP or an amount of BGP load sharing supported by BGP. After obtaining the BGP default configuration parameter, the first network device can more effectively monitor the second network device, for example, control an amount of BGP load sharing of the second network device.

The first network device may more flexibly manage the second network device by obtaining the standard information or the feature information of the second network device. For example, when the second network device does not support a feature, the first network device does not deploy a configuration related to the feature on the second network device. When the second network device does not support a standard, the first network device does not deploy a technical solution related to the standard on the second network device.

Optionally, the BMP message further includes a BGP routing rule of the second network device, and the BGP routing rule includes one or more of the following: a preferred BGP route rule indicating a short AS path length; or a preferred BGP route rule indicating a long route survival period.

The first network device can effectively perform path planning and selection by obtaining the BGP routing rule of the second network device.

Figure 5:
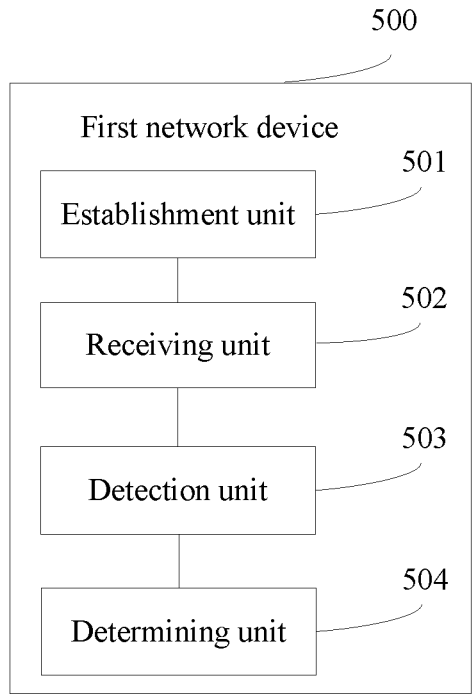
FIG. 5 is a schematic structural diagram of a first network device according to an embodiment of this application.

Referring to FIG. 5, with reference to the application scenario shown in FIG. 1, an embodiment of this application provides a first network device 500. The first network device 500 in FIG. 5 may perform the method in the embodiment shown in FIG. 2 or FIG. 3, and the first network device 500 may be the first network device in the embodiment in FIG. 2, FIG. 3, or FIG. 4. The first network device 500 includes: an establishment unit 501, configured to: establish a first BMP session with a second network device, and establish a second BMP session with a third network device; a receiving unit 502, configured to receive, by using the first BMP session established by the establishment unit 501, a first BGP route set sent by the second network device, where the first BGP route set includes one or more BGP routes sent by the second network device to the third network device, and a BGP peer has been established between the third network device and the second network device, where the receiving unit 502 is further configured to receive, by using the second BMP session established by the establishment unit 501, a second BGP route set sent by the third network device, where the second BGP route set includes one or more BGP routes received by the third network device from the second network device; a detection unit 503, configured to detect that the second BGP route set includes a first BGP route but the first BGP route set does not include the first BGP route; and a determining unit 504, configured to: when the detection unit 503 detects that the second BGP route set includes the first BGP route but the first BGP route set does not include the first BGP route, determine the first BGP route as an unavailable route.

Optionally, the first network device 500 further includes: a processing unit, configured to: after the determining unit determines the first BGP route as an unavailable route, identify the first BGP route as an unavailable route; and a sending unit, configured to send the first BGP route identified by the processing unit as an unavailable route to the third network device.

Optionally, the processing unit is further configured to plan a forwarding path by using an available route in the second BGP route set, where the available route in the second BGP route set does not include the first BGP route.

Figure 6:
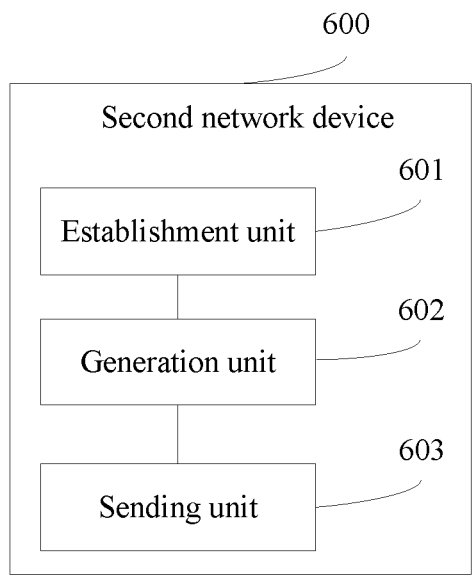
FIG. 6 is a schematic structural diagram of a second network device according to an embodiment of this application.

Referring to FIG. 6, with reference to the application scenario shown in FIG. 1, an embodiment of this application provides a second network device 600. The second network device 600 in FIG. 6 may perform the method in the embodiment shown in FIG. 2, FIG. 3, or FIG. 4, and the second network device 600 may be the second network device in FIG. 2, FIG. 3, or FIG. 4. The second network device 600 includes: an establishment unit 601, configured to establish a BMP session with a first network device; a generation unit 602, configured to generate a BMP message, where the BMP message includes a BGP route set, the BGP route set includes a first BGP route sent by the second network device to a third network device, and a BGP peer has been established between the third network device and the second network device; and a sending unit 603, configured to send the BMP message to the first network device by using the BMP session, to trigger the first network device to detect a BGP route in the BGP route set in the BMP message.

Figure 7:
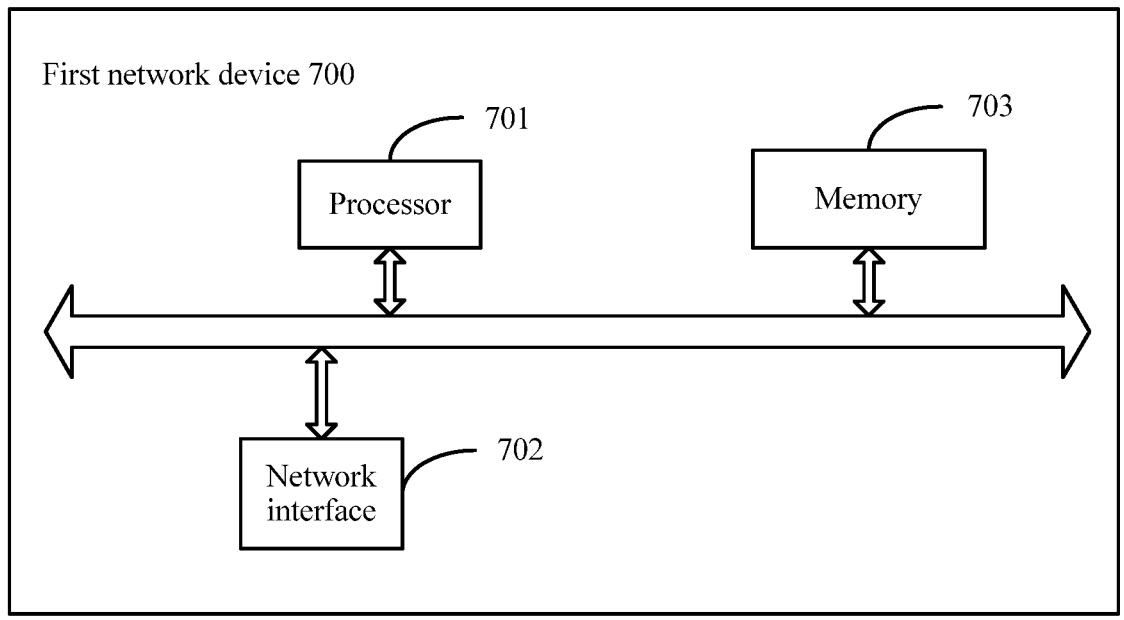
FIG. 7 is a schematic structural diagram of another first network device according to an embodiment of this application.

FIG. 7 shows a first network device 700 according to an embodiment of this application. The first network device 700 in FIG. 7 may perform the method in the embodiment shown in FIG. 2, FIG. 3, or FIG. 4, and the first network device 700 may be the first network device in the embodiment in FIG. 2, FIG. 3, or FIG. 4. The first network device 700 includes a processor 701, a network interface 702, and a memory 703. The processor 701 includes but is not limited to one or more of a CPU, a network processor (NP), an application-specific integrated circuit (ASIC), or a programmable logic device (PLD). The PLD may be a complex programmable logic device (CPLD), a field-programmable gate array (FPGA), generic array logic (GAL), or any combination thereof.

The memory 703 may include but is not limited to a content addressable memory (CAM), for example, a ternary content-addressable memory (TCAM) or a random-access memory (RAM).

The network interface 702 may include a common physical interface, and the physical interface may be an Ethernet interface or an asynchronous transfer mode (ATM) interface. The processor 701, the network interface 702, and the memory 703 may be integrated into one or more independent circuits or hardware, for example, an ASIC.

The memory 703 may be configured to store program code and data of the first network device 700, and the processor 701 is configured to invoke a program instruction in the memory 703 to perform the method shown in the foregoing embodiment. For a specific execution step, refer to the foregoing embodiment. Details are not described herein again.

Figure 8:
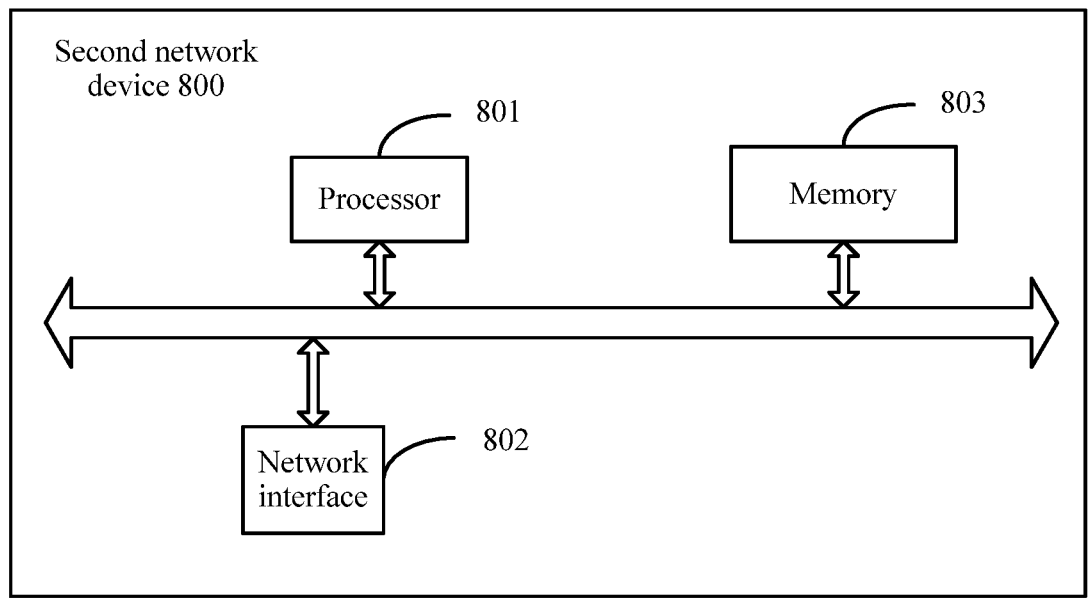
FIG. 8 is a schematic structural diagram of another second network device according to an embodiment of this application.

FIG. 8 is a schematic structural diagram of a second network device 800 according to an embodiment of this application. The second network device 800 provided in this embodiment can be applied to the method in the embodiment in FIG. 2, FIG. 3, or FIG. 4, to implement a function of the second network device 800. The second network device 800 may be the second network device in the embodiment in FIG. 2, FIG. 3, or FIG. 4. The second network device 800 includes a processor 801, a network interface 802, and a memory 803. The processor 801 includes but is not limited to one or more of a CPU, an NP, an ASIC, or a PLD. The PLD may be a CPLD, an FPGA, a GAL, or any combination thereof.

The memory 803 may include but is not limited to a CAM, for example, a TCAM or a RAM.

The network interface 802 may include a common physical interface, and the physical interface may be an Ethernet interface or an ATM interface. The processor 801, the network interface 802, and the memory 803 may be integrated into one or more independent circuits or hardware, for example, an ASIC.

The memory 803 may be configured to store program code and data of the second network device 800, and the processor 801 is configured to invoke a program instruction in the memory 803 to perform the method shown in the foregoing embodiment. For a specific execution step, refer to the foregoing embodiment. Details are not described herein again.

Figure 9:
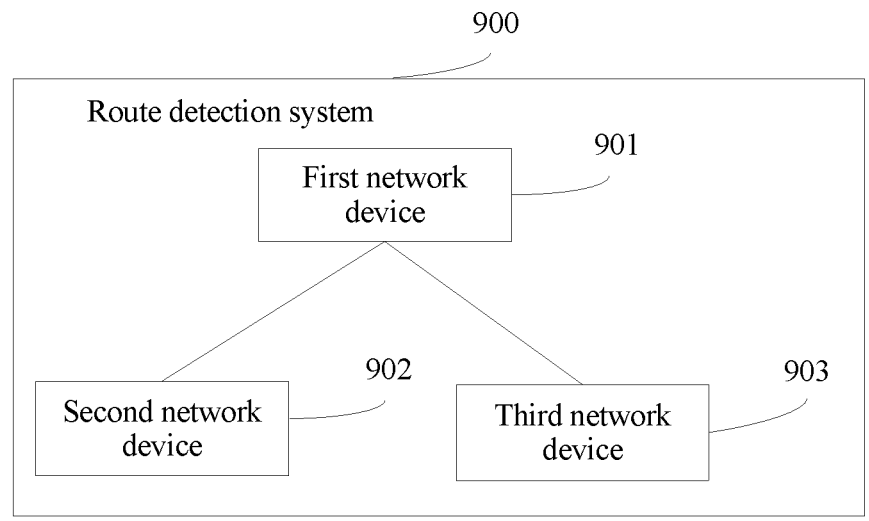
FIG. 9 is a schematic diagram of a route detection system according to an embodiment of this application.

Referring to FIG. 9, an embodiment of this application provides a route detection system 900. The system 900 includes a first network device 901, a second network device 902, and a third network device 903.

The second network device 902 is configured to: establish a first BMP session with the first network device 901, and send a first BGP route set to the first network device 901, where the first BGP route set includes one or more BGP routes sent by the second network device 902 to the third network device 903, and a BGP peer has been established between the third network device 903 and the second network device 902.

The third network device 903 is configured to: establish a second BMP session with the first network device 901, and send a second BGP route set to the first network device 901, where the second BGP route set includes one or more BGP routes received by the third network device 903 from the second network device 902.

The first network device 901 is configured to: receive, by using the first BMP session, the first BGP route set sent by the second network device 902; receive, by using the second BGP session, the second BGP route set sent by the third network device 903; and when the first network device 901 detects that the second BGP route set includes a first BGP route but the first BGP route set does not include the first BGP route, determine the first BGP route as an unavailable route.

Optionally, the first network device 901 may be the first network device in the embodiment shown in FIG. 2, FIG. 3, FIG. 4, FIG. 5, or FIG. 7. The second network device 902 may be the second network device in the embodiment shown in FIG. 2, FIG. 3, FIG. 4, FIG. 6, or FIG. 8. The third network device 903 may be the third network device in the embodiment shown in FIG. 2, FIG. 3, or FIG. 4.

Figure 10:
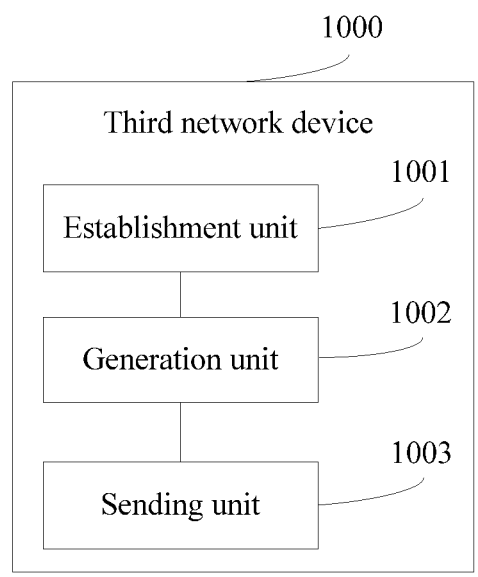
FIG. 10 is a schematic structural diagram of a third network device according to an embodiment of this application.

Referring to FIG. 10, with reference to the application scenario shown in FIG. 1, an embodiment of this application provides a third network device 1000. The third network device 1000 in FIG. 10 may perform the method in the embodiment shown in FIG. 3, and the third network device 1000 may be the third network device in FIG. 2, FIG. 3, or FIG. 4. The third network device 1000 includes: an establishment unit 1001, configured to establish a BMP session with a first network device; a generation unit 1002, configured to generate a BMP message, where the BMP message includes a second BGP route set, the second BGP route set includes one or more BGP routes received by the third network device from a second network device, and a BGP peer has been established between the third network device and the second network device; and a sending unit 1003, configured to send the BMP message to the first network device by using the BMP session, where a second BGP route in the second BGP route set includes attribute information, the second BGP route is any BGP route in the second BGP route set, and the attribute information includes one or more of the following information: priority information used to indicate a priority of the second BGP route; status information used to indicate a status of the second BGP route in an RIB of the third network device; indication information used to indicate whether the second BGP route is delivered to a forwarding information base FIB; or information used to indicate a status of the second BGP route information delivered to the FIB.

Figure 11:
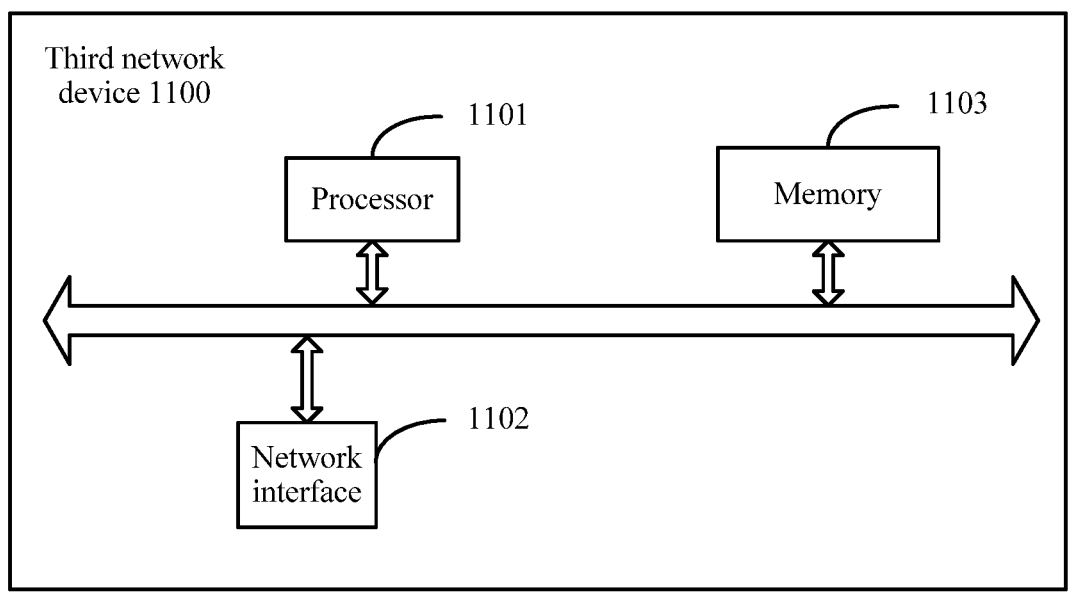
FIG. 11 is a schematic structural diagram of another third network device according to an embodiment of this application.

FIG. 11 is a schematic structural diagram of a third network device 1100 according to an embodiment of this application. The third network device 1100 provided in this embodiment can be applied to the method in the embodiment in FIG. 3, to implement a function of the third network device 1100. The third network device 1100 may be the third network device in FIG. 2, FIG. 3, or FIG. 4. The third network device 1100 includes a processor 1101, a network interface 1102, and a memory 1103. The processor 1101 includes but is limited to one or more of a CPU, an NP, an ASIC, or a PLD. The PLD may be a CPLD, an FPGA, a GAL, or any combination thereof.

The memory 1103 may include but is not limited to a CAM, for example, a TCAM or a RAM.

The network interface 1102 may include a common physical interface, and the physical interface may be an Ethernet interface or an ATM interface. The processor 1101, the network interface 1102, and the memory 1103 may be integrated into one or more independent circuits or hardware, for example, an ASIC.

The memory 1103 may be configured to store program code and data of the second network device 1100, and the processor 1101 is configured to invoke a program instruction in the memory 1103 to perform the method shown in the foregoing embodiment. For a specific execution step, refer to the foregoing embodiment. Details are not described herein again.

Persons of ordinary skill in the art may understand that all or some of the steps of the method in the embodiments of the present application may be implemented by a program instructing relevant hardware. The program may be stored in a computer readable storage medium. When the program runs, the steps of the method in the embodiments of the present application are performed. The storage medium may be at least one of the following media: media that are capable of storing program code, such as a Read-Only Memory (ROM), a RAM, a magnetic disk, or an optical disc.

Finally, it should be noted that the foregoing embodiments are merely intended to describe examples of the technical solutions of this application other than limiting this application. Although this application and benefits of this application are described in detail with reference to the foregoing embodiments, persons of ordinary skill in the art should understand that they may still make modifications to the technical solutions described in the foregoing embodiments or make equivalent replacements to some technical features thereof, without departing from the scope of the claims of this application.

What is claimed is:

1. A method, comprising:
  establishing, by a first network device, a first Border Gateway Protocol Monitoring Protocol (BMP) session with a second network device, and establishing, by the first network device, a second BMP session with a third network device, and wherein a Border Gateway Protocol (BGP) session is established between the second network device and the third network device;
  receiving, by the first network device using the first BMP session, a first BGP route set sent by the second network device, wherein the first BGP route set comprises one or more first BGP routes sent by the second network device to the third network device, wherein the one or more first BGP routes of the first BGP route set is of an adjacency-routing information base-output (Adj-RIB-Out) of the second network device;
  receiving, by the first network device using the second BMP session, a second BGP route set sent by the third network device, wherein the second BGP route set comprises one or more second BGP routes received by the third network device from the second network device, wherein the one or more second BGP routes of the second BGP route set is of an adjacency-routing information base-input (Adj-RIB-In) of the third network device; and
  in response to the first network device detecting that the second BGP route set comprises a first BGP route and the first BGP route set does not comprise the first BGP route, determining, by the first network device, the first BGP route to be an unavailable route.

2. The method according to claim 1, wherein after determining, by the first network device, the first BGP route to be an unavailable route, the method further comprises:
  identifying, by the first network device, the first BGP route as an unavailable route; and
  sending the first BGP route identified as an unavailable route to the third network device.

3. The method according to claim 1, further comprising:
  planning, by the first network device, a forwarding path using an available route in the second BGP route set, wherein the available route in the second BGP route set does not comprise the first BGP route.

4. The method according to claim 1, wherein a second BGP route in the second BGP route set comprises attribute information, and the attribute information comprises priority information indicating a priority of the second BGP route.

5. The method according to claim 1, wherein a second BGP route in the second BGP route set comprises attribute information, and the attribute information comprises status information indicating a status of the second BGP route in a routing information base (RIB) of the third network device.

6. The method according to claim 1, wherein a second BGP route in the second BGP route set comprises attribute information, and the attribute information comprises indication information indicating whether the second BGP route is delivered to a forwarding information base (FIB).

7. The method according to claim 1, wherein a second BGP route in the second BGP route set comprises attribute information, and the attribute information comprises information indicating a status of the second BGP route delivered to a forwarding information base (FIB).

8. A method, comprising:
establishing, by a second network device, a Border Gateway Protocol Monitoring Protocol (BMP) session with a first network device, and establishing, by the second network device, a border gateway protocol (BGP) session with a third network device;
generating, by the second network device, a BMP message, wherein the BMP message comprises a BGP route set, the BGP route set comprises a one or more BGP routes sent by the second network device to the third network device, wherein the one or more BGP routes of the first BGP route set is of an adjacency-routing information base-output (Adj-RIB-Out) of the second network device; and
sending, by the second network device, the BMP message to the first network device using the BMP session.

9. The method according to claim 8, wherein the BGP route set further comprises a second BGP route received by the second network device, the second BGP route comprises attribute information, and the attribute information comprises priority information indicating a priority of the second BGP route.

10. The method according to claim 8, wherein the BGP route set further comprises a second BGP route received by the second network device, the second BGP route comprises attribute information, and the attribute information comprises status information indicating a status of the second BGP route in a routing information base (RIB) of the second network device.

11. The method according to claim 8, wherein the BGP route set further comprises a second BGP route received by the second network device, the second BGP route comprises attribute information, and the attribute information comprises:
indication information indicating whether the second BGP route is delivered to a forwarding information base (FIB); or
information indicating a status of the second BGP route information delivered to the FIB.

12. The method according to claim 8, wherein the BMP message further comprises specification information of the second network device, and the specification information comprises:
a quantity of BGP routes that can be accommodated by the second network device.

13. The method according to claim 8, wherein the BMP message further comprises specification information of the second network device, and the specification information comprises:
a quantity of peers supported by the second network device for BGP or an amount of BGP load sharing supported by the second network device.

14. The method according to claim 8, wherein the BMP message further comprises specification information of the second network device, and the specification information comprises:
information of a communication protocol supported by the second network device.

15. The method according to claim 8, wherein the BMP message further comprises a second BGP routing rule of the second network device, and the second BGP routing rule comprises:
a preferred BGP route rule indicating a short autonomous system path (AS) path length.

16. The method according to claim 8, wherein the BMP message further comprises a BGP routing rule of the second network device, and the BGP routing rule comprises:
a preferred BGP route rule indicating a long route survival period.

17. The method according to claim 8, wherein the BMP message is used to trigger the first network device to monitor BGP routes sent by the second network device to the third network device.

18. A first network device, wherein the first network device comprises:
a non-transitory memory comprising instructions;
a processor coupled to the non-transitory memory, wherein when the instructions are executed by the processor the instructions cause the first network device to:
establish a first Border Gateway Protocol Monitoring Protocol (BMP) session with a second network device, and establish a second BMP session with a third network device, and wherein a Border Gateway Protocol (BGP) session is established between the second network device and the third network device;
receive, using the first BMP session, a first BGP route set sent by the second network device, wherein the first BGP route set comprises one or more first BGP routes sent by the second network device to the third network device, and wherein the one or more first BGP routes of the first BGP route set is of an adjacency-routing information base-output (Adj-RIB-Out) of the second network device;
receive, using the second BMP session, a second BGP route set sent by the third network device, wherein the second BGP route set comprises one or more second BGP routes received by the third network device from the second network device, wherein the one or more second BGP routes of the second BGP route set is of an adjacency-routing information base-input (Adj-RIB-In) of the third network device;
detect that the second BGP route set comprises a first BGP route and the first BGP route set does not comprise the first BGP route; and
in response to detecting that the second BGP route set comprises the first BGP route and the first BGP route set does not comprise the first BGP route, determine the first BGP route as to be an unavailable route.

19. The first network device according to claim 18, wherein when the instructions are executed by the processor the instructions further cause the first network device to:
identify the first BGP route as an unavailable route after the determining the first BGP route to be an unavailable route; and
send the first BGP route identified as an unavailable route to the third network device.

20. The first network device according to claim 18, wherein when the instructions are executed by the processor the instructions cause the first network device to:
plan a forwarding path using an available route in the second BGP route set, wherein the available route in the second BGP route set does not comprise the first BGP route.

21. A second network device, comprising:

a non-transitory memory comprising instructions;

a processor coupled to the non-transitory memory, wherein when the instructions are executed by the processor the instructions cause the second network device to:

establish a Border Gateway Protocol Monitoring Protocol (BMP) session with a first network device, and establish a Border Gateway Protocol (BGP) session with a third network device;

generate a BMP message, wherein the BMP message comprises a Border Gateway Protocol (BGP) route set, the BGP route set comprises a first BGP route sent by the second network device to the third network device, wherein the first BGP route of the first BGP route set is of an adjacency-routing information base-output (Adj-RIB-Out) of the second network device; and send, by the second network device, the BMP message to the first network device using the BMP session.

22. The second network device according to claim 21, wherein the BGP route set further comprises a second BGP route received by the second network device, the second BGP route comprises attribute information, and the attribute information comprises priority information indicating a priority of the second BGP route.

23. The second network device according to claim 21, wherein the BGP route set further comprises a second BGP route received by the second network device, the second BGP route comprises attribute information, and the attribute information comprises status information indicating a status of the second BGP route in a routing information base (RIB) of the second network device.

* * * * *

UNITED STATES PATENT AND TRADEMARK OFFICE
CERTIFICATE OF CORRECTION

PATENT NO. : 10,892,977 B2
APPLICATION NO. : 16/427557
DATED : January 12, 2021
INVENTOR(S) : Haijun Xu Page 1 of 1

It is certified that error appears in the above-identified patent and that said Letters Patent is hereby corrected as shown below:

In the Claims

In Column 15, Line 14, In Claim 8, delete "set, the BGP route set comprises a one or more BGP" and insert --set, the BGP route set comprises one or more BGP--.

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*